(12) United States Patent
Gounares et al.

(10) Patent No.: US 9,417,935 B2
(45) Date of Patent: Aug. 16, 2016

(54) MANY-CORE PROCESS SCHEDULING TO MAXIMIZE CACHE USAGE

(75) Inventors: Alexander G. Gounares, Kirkland, WA (US); Charles D. Garrett, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 13/461,748

(22) Filed: May 1, 2012

(65) Prior Publication Data

US 2013/0117753 A1 May 9, 2013

(51) Int. Cl.
| | |
|---|---|
| *G06F 9/455* | (2006.01) |
| *G06F 9/54* | (2006.01) |
| *G06F 9/48* | (2006.01) |

(52) U.S. Cl.
CPC .............. *G06F 9/546* (2013.01); *G06F 9/4881* (2013.01); *G06F 2209/483* (2013.01); *G06F 2209/484* (2013.01)

(58) Field of Classification Search
None
See application file for complete search history.

(56) References Cited

U.S. PATENT DOCUMENTS

| | | | |
|---|---|---|---|
| 3,643,227 A | 2/1972 | Smith et al. | |
| 4,631,674 A | 12/1986 | Blandy | |
| 5,423,040 A * | 6/1995 | Epstein et al. | ................ 718/102 |
| 5,506,987 A | 4/1996 | Abramson et al. | |
| 5,900,001 A | 5/1999 | Wolczko et al. | |
| 5,903,900 A | 5/1999 | Knippel et al. | |
| 6,006,235 A | 12/1999 | Macdonald et al. | |
| 6,038,572 A | 3/2000 | Schwartz et al. | |
| 6,047,295 A | 4/2000 | Endicott et al. | |
| 6,098,080 A | 8/2000 | Endicott et al. | |
| 6,104,962 A | 8/2000 | Sastry | |
| 6,128,642 A | 10/2000 | Doraswamy et al. | |
| 6,230,183 B1 | 5/2001 | Yocom et al. | |

(Continued)

FOREIGN PATENT DOCUMENTS

| | | |
|---|---|---|
| EP | 1912119 A | 4/2008 |
| KR | 1019980079594 A | 11/1998 |

(Continued)

OTHER PUBLICATIONS

International Searching Authority, International Search Report and Written Opinion, Jan. 24, 2013, PCT/US2012/045964, Korean Intellectual Property Office, Republic of Korea (9 pgs.).

(Continued)

*Primary Examiner* — Eric C Wai
*Assistant Examiner* — James J Lee
(74) *Attorney, Agent, or Firm* — Ben Tabor; Raghu Chinagudabha; Micky Minhas (57) ABSTRACT

A process scheduler for multi-core and many-core processors may place related executable elements that share common data on the same cores. When executed on a common core, sequential elements may store data in memory caches that are very quickly accessed, as opposed to main memory which may take many clock cycles to access the data. The sequential elements may be identified from messages passed between elements or other relationships that may link the elements. In one embodiment, a scheduling graph may be constructed that contains the executable elements and relationships between those elements. The scheduling graph may be traversed to identify related executable elements and a process scheduler may attempt to place consecutive or related executable elements on the same core so that commonly shared data may be retrieved from a memory cache rather than main memory.

19 Claims, 6 Drawing Sheets

(56) References Cited

U.S. PATENT DOCUMENTS

| | | |
|---|---|---|
| 6,289,360 B1 | 9/2001 | Kolodner et al. |
| 6,308,319 B1 | 10/2001 | Bush et al. |
| 6,317,756 B1 | 11/2001 | Kolodner et al. |
| 6,421,704 B1 | 7/2002 | Waldo et al. |
| 6,484,188 B1 | 11/2002 | Kwong et al. |
| 6,490,599 B2 | 12/2002 | Kolodner et al. |
| 6,490,612 B1 | 12/2002 | Jones et al. |
| 6,516,461 B1 | 2/2003 | Ichisugi |
| 6,519,615 B1 | 2/2003 | Wollrath et al. |
| 6,542,978 B2 | 4/2003 | Goldstein et al. |
| 6,560,773 B1 | 5/2003 | Alexander, III et al. |
| 6,564,240 B2 | 5/2003 | Waldo et al. |
| 6,658,449 B1 | 12/2003 | Brenner et al. |
| 6,735,769 B1 | 5/2004 | Brenner et al. |
| 6,738,875 B1 | 5/2004 | Wang |
| 6,748,593 B1 * | 6/2004 | Brenner ............... G06F 9/5083 709/223 |
| 6,760,736 B2 | 7/2004 | Waldo et al. |
| 6,763,520 B1 | 7/2004 | Seeds |
| 6,823,515 B2 | 11/2004 | Livecchi |
| 6,832,370 B1 | 12/2004 | Srinivasan et al. |
| 6,868,488 B2 | 3/2005 | Garthwaite |
| 6,873,952 B1 | 3/2005 | Bailey et al. |
| 6,912,554 B2 | 6/2005 | Yuasa |
| 6,918,111 B1 | 7/2005 | Damron et al. |
| 6,925,644 B2 | 8/2005 | Waldo et al. |
| 6,954,775 B1 | 10/2005 | Shanklin et al. |
| 6,986,140 B2 | 1/2006 | Brenner et al. |
| 6,993,767 B2 | 1/2006 | Brenner et al. |
| 6,999,979 B2 | 2/2006 | Garthwaite |
| 7,003,760 B1 | 2/2006 | Das |
| 7,016,923 B2 | 3/2006 | Garthwaite et al. |
| 7,031,990 B2 | 4/2006 | Garthwaite |
| 7,035,884 B2 | 4/2006 | Garthwaite |
| 7,058,670 B2 | 6/2006 | Garthwaite |
| 7,062,518 B2 | 6/2006 | Garthwaite |
| 7,062,519 B2 | 6/2006 | Garthwaite |
| 7,069,279 B1 | 6/2006 | Rau et al. |
| 7,069,280 B2 | 6/2006 | Garthwaite |
| 7,069,281 B2 | 6/2006 | Garthwaite |
| 7,092,978 B2 | 8/2006 | Garthwaite |
| 7,096,238 B2 | 8/2006 | Garthwaite |
| 7,136,887 B2 | 11/2006 | Garthwaite et al. |
| 7,143,124 B2 | 11/2006 | Garthwaite |
| 7,188,129 B2 | 3/2007 | Garthwaite |
| 7,209,935 B2 | 4/2007 | Garthwaite |
| 7,225,439 B2 | 5/2007 | Garthwaite |
| 7,228,541 B2 | 6/2007 | Gupton et al. |
| 7,251,815 B2 | 7/2007 | Donovan et al. |
| 7,308,466 B2 | 12/2007 | Houldsworth |
| 7,404,182 B1 | 7/2008 | Garthwaite et al. |
| 7,412,580 B1 | 8/2008 | Garthwaite |
| 7,487,237 B2 | 2/2009 | Lloyd et al. |
| 7,565,386 B2 | 7/2009 | Joisha |
| 7,565,499 B1 | 7/2009 | Garthwaite |
| 7,599,973 B2 | 10/2009 | Detlefs et al. |
| 7,613,753 B2 | 11/2009 | Cornet et al. |
| 7,640,544 B2 | 12/2009 | Flood et al. |
| 7,752,417 B2 | 7/2010 | Manczak et al. |
| 7,797,670 B2 | 9/2010 | Bumgarner et al. |
| 7,865,707 B2 | 1/2011 | Bittlingmayer et al. |
| 7,890,712 B2 | 2/2011 | Bitner et al. |
| 7,984,083 B2 | 7/2011 | Bacon et al. |
| 7,996,446 B2 | 8/2011 | Bacon et al. |
| 8,028,277 B2 | 9/2011 | Breitgand et al. |
| 8,055,725 B2 | 11/2011 | Alam et al. |
| 8,108,863 B2 | 1/2012 | Rakvic et al. |
| 8,595,743 B2 | 11/2013 | Gounares et al. |
| 8,607,018 B2 | 12/2013 | Gounares et al. |
| 8,615,766 B2 | 12/2013 | Gounares |
| 8,650,538 B2 | 2/2014 | Gounares |
| 8,656,134 B2 | 2/2014 | Gounares et al. |
| 8,656,135 B2 | 2/2014 | Gounares et al. |
| 8,656,378 B2 | 2/2014 | Gounares et al. |
| 2001/0018701 A1 | 8/2001 | Livecchi |
| 2003/0061395 A1 * | 3/2003 | Kingsbury ............... G06F 9/544 719/312 |
| 2003/0200356 A1 | 10/2003 | Hue |
| 2003/0212731 A1 | 11/2003 | Brenner et al. |
| 2004/0194104 A1 | 9/2004 | Beresnevichiene et al. |
| 2005/0071847 A1 | 3/2005 | Bentley et al. |
| 2005/0144364 A1 | 6/2005 | Tu et al. |
| 2005/0166193 A1 | 7/2005 | Smith et al. |
| 2005/0210472 A1 | 9/2005 | Accapadi et al. |
| 2006/0070048 A1 * | 3/2006 | Li et al. ......................... 717/144 |
| 2006/0294167 A1 | 12/2006 | Borman et al. |
| 2007/0174837 A1 * | 7/2007 | Wang et al. .................... 718/100 |
| 2007/0288911 A1 | 12/2007 | Martin et al. |
| 2007/0299980 A1 * | 12/2007 | Amini ..................... H04L 47/10 709/231 |
| 2008/0005719 A1 | 1/2008 | Morris |
| 2008/0126453 A1 | 5/2008 | Cornet et al. |
| 2008/0139191 A1 | 6/2008 | Melnyk et al. |
| 2008/0271032 A1 | 10/2008 | Twaddle |
| 2009/0019449 A1 * | 1/2009 | Choi et al. .................... 718/105 |
| 2009/0089552 A1 * | 4/2009 | Inchingolo et al. ........... 712/216 |
| 2010/0018701 A1 | 1/2010 | Peter et al. |
| 2010/0211953 A1 * | 8/2010 | Wakeling ............... G06F 9/5038 718/102 |
| 2010/0318630 A1 | 12/2010 | Howell et al. |
| 2010/0333109 A1 | 12/2010 | Milnor |
| 2011/0067030 A1 | 3/2011 | Isard et al. |
| 2011/0161978 A1 * | 6/2011 | Jang et al. .................... 718/104 |
| 2012/0047514 A1 | 2/2012 | Seo et al. |
| 2012/0204189 A1 | 8/2012 | Eichenberger et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0284730 A1 | 11/2012 | Decusatis et al. |
| 2012/0297163 A1 | 11/2012 | Breternitz et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013309 A1 | 1/2014 | Gounares |
| 2014/0013311 A1 | 1/2014 | Garrett et al. |
| 2014/0019598 A1 | 1/2014 | Krajec |
| 2014/0019756 A1 | 1/2014 | Krajec |
| 2014/0019879 A1 | 1/2014 | Krajec et al. |
| 2014/0019985 A1 | 1/2014 | Krajec |

(56) References Cited

U.S. PATENT DOCUMENTS

| | | |
|---|---|---|
| 2014/0025572 A1 | 1/2014 | Krajec |
| 2014/0026142 A1 | 1/2014 | Gounares et al. |
| 2014/0040591 A1 | 2/2014 | Gounares |

FOREIGN PATENT DOCUMENTS

| | | |
|---|---|---|
| KR | 1019990062577 A | 7/1999 |
| KR | 20010070306 A | 7/2001 |
| KR | 1020010070306 A | 7/2001 |
| KR | 1020080021491 A | 3/2008 |

OTHER PUBLICATIONS

Daniel Lenoski, James Laudon, Kourosh Gharachorloo, Wolf-Dietrich Weber, Anoop Gupta, John Hennessy, Mark Horowitz,and Monica S. Lam, The Stanford Dash Multiprocessor, Mar. 1992, IEEE.

Kistler, Thomas, "Continuous Program Optimization", PhD Dissertation, University of California, Irvine, 1999.

Kistler, Thomas, "Continuous Program Optimization: A Case Study", ACM Transactions on Programming Languages and Systems, vol. 25, No. 4, Jul. 2003, pp. 500-548.

Tong Li, Dan Baumberger, David A. Koufaty, and Scott Hahn, Efficient Operating System Scheduling for Performance-Asymmetric Multi-Core Architectures, Copyright 2007, ACM.

Yang Wang, Paul Lu, Using Dataflow Information to Improve Inter-Workflow Instance Concurrency, 2005, IEEE.

International Search Report, Feb. 27, 2013, Korean Intellectual Property Office, PCT/US2012/056701.

International Search Report, Jan. 29, 2013, Korean Intellectual Property Office, PCT/US2012/043811.

International Searching Authority, International Search Report and Written Opinion, Jan. 25, 2013, PCT/US2012/041036, Korean Intellectual Property Office, Republic of Korea.

International Searching Authority, International Search Report and Written Opinion, Korean Intellectual Property Office, Mar. 12, 2013, PCT/US2012/066098.

International Searching Authority, International Search Report and Written Opinion, Korean Intellectual Property Office, Feb. 5, 2013, PCT/US2012/056704.

* cited by examiner

MANY-CORE PROCESS SCHEDULING TO MAXIMIZE CACHE USAGE

BACKGROUND

Process scheduling is a general term that may refer to how a computer system utilizes its resources. Different levels of process schedulers may manage high level selections such as which applications to execute, while mid-level or low level process schedulers may determine which sections of each application may be executed. A low level process scheduler may perform functions such as time slicing or time division multiplexing that may allocate processors or other resources to multiple jobs.

SUMMARY

A process scheduler for multi-core and many-core processors may place related executable elements that share common data on the same cores. When executed on a common core, sequential elements may store data in memory caches that are very quickly accessed, as opposed to main memory which may take many clock cycles to access the data. The sequential elements may be identified from messages passed between elements or other relationships that may link the elements. In one embodiment, a scheduling graph may be constructed that contains the executable elements and relationships between those elements. The scheduling graph may be traversed to identify related executable elements and a process scheduler may attempt to place consecutive or related executable elements on the same core so that commonly shared data may be retrieved from a memory cache rather than main memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Executable elements that have shared memory elements or are otherwise related may be executed on the same processor. A first executable element that creates an output or other shared memory object may cause the object to be stored in cached memory, which may be retrieved by a second executable element that may consume the object.

The relationships between executable elements may be identified by creating a scheduling graph that links executable elements together with their relationships. In some cases, the relationships may identify shared memory objects, such as when the output of a first executable element is consumed as an input to a second executable element.

During normal operation, many processors use one or more levels of cached memory to speed up processing. Objects that are recently accessed may be stored in a level 1 data cache, and as those objects age, they may be moved to levels 2, 3, or other levels. In many processor architectures, the objects accessed in a data cache may be automatically moved from level to level as they age.

Processors that use cached memory generally have a mechanism to store the cached objects in main memory. Such an operation may be performed as a parallel operation to the normal command execution of the processors. In some embodiments, such functions may be implemented in hardware to speed processing.

When a processor accesses object in cached memory, the access time may be on the order of one or two processor clock cycles. In comparison, accesses to the same object when the object is in main memory may be on the order of a hundred or more processor cycles. Because the processor cannot perform an operation without the data present, accesses to main memory result in the processor waiting for the data to arrive before resuming execution.

By executing related executable elements that share one or more memory objects on the same processor and one after the other, the cost of loading the memory object from main memory may be reduced significantly. This may be because the second executable element may access a memory object from cache, rather than having to recall the memory object from main memory.

In another example, some programming paradigms use message passing between executable elements. A message passing relationship may identify certain data objects that are shared between the elements. By executing the two elements in sequence, the data passed in the message may be still in cache memory when the second element is executing, thus saving many process cycles.

Further, in systems that contain many executable elements, the performance benefits of such a system may be significant. Examples of such systems may be applications or executable code that may be written in functional languages or in a functional language style that may create many hundreds, thousands, and sometimes millions of executable elements.

In such systems, the cost of managing the large numbers of executable elements may be compounded when memory objects are accessed from main memory rather than from a cache. By placing related executable elements on the same processor and within a short period of time from each other, there is a higher probability of accessing common memory objects from cache rather than main memory.

For the purposes of this specification and claims, the term "executable element" may define a set of instructions that may be executed by a processor. In a typical embodiment, an executable element may be machine level commands that may be sent to a processor. A single computer application may be made up of many executable elements. An executable element may also be referred to as a job, application, code chunk, or other term.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
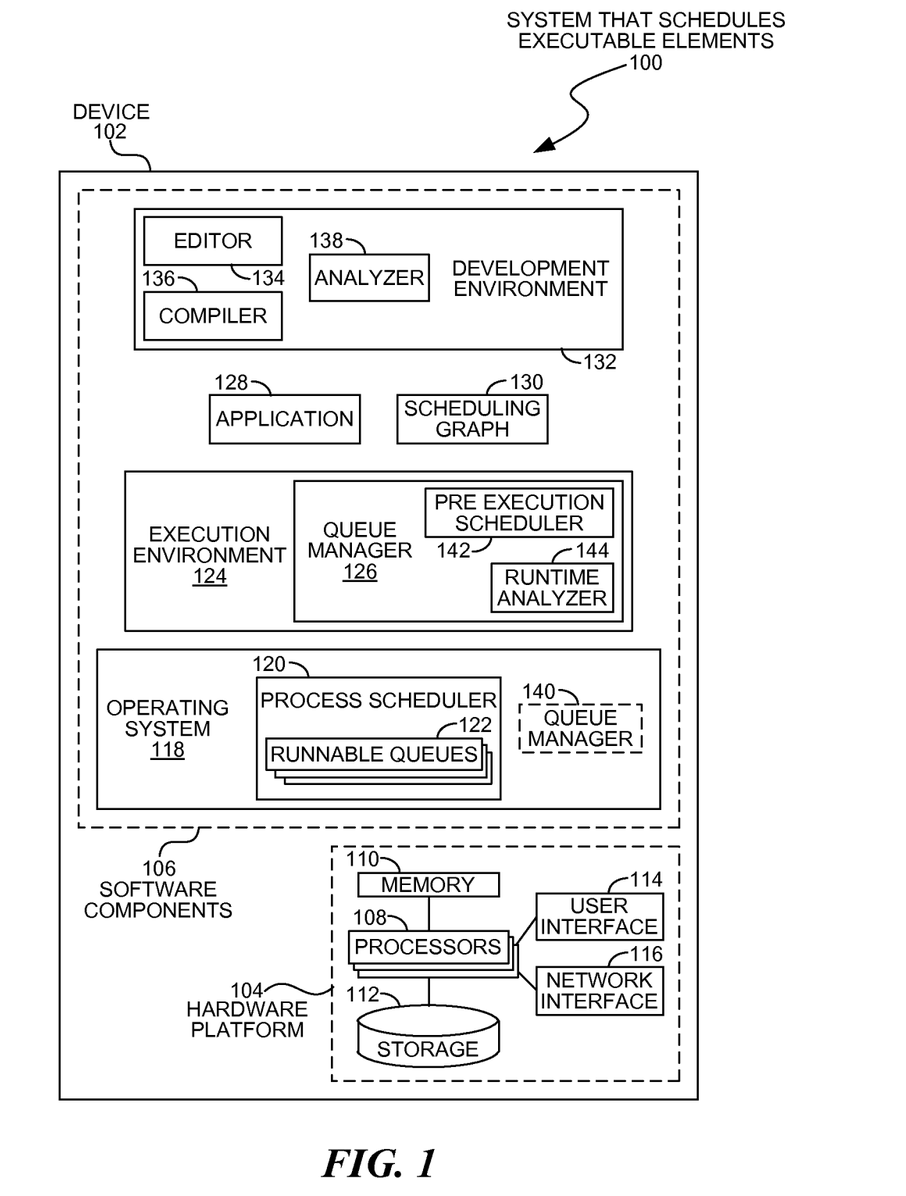
FIG. 1 is a diagram illustration of an embodiment showing a system that schedules executable elements.

FIG. 1 is a diagram of an embodiment 100 showing a system that may operate a process scheduler based on input from a scheduling graph. Embodiment 100 is a simplified example of the various software and hardware components that may be used an execution environment for applications that may have many executable elements.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system 102 that may have a process scheduler that may manage executable elements based on knowledge from a scheduling graph. The system may attempt to place executable elements that access the same memory objects on the same processor so that the executable elements store and retrieve the memory objects from cached memory.

A queue manager may identify related executable elements from a scheduling graph. The scheduling graph may identify the relationships between executable elements and may include memory objects that may be passed from one executable element to another. By identifying these related elements and causing them to execute on the same processor where a memory object may already be in cached memory, the throughput of the overall system may be increased.

A process scheduler may manage executable elements by identifying executable elements that are likely to be executed once dependencies are cleared. The executable elements waiting on dependencies from other executable elements may be identified from a scheduling graph that may include all of the executable elements of an application.

A process scheduler may be an operating system function that schedules executable code on a processor. In many computer systems, a process scheduler may create the illusion of executing several processes concurrently by time slicing or allocating a computing resource to different processes at different time intervals.

The process scheduler may have a queue manager that may analyze a scheduling graph to identify functional elements to add to runnable queues for each processor. The scheduling graph may contain each executable element and relationships between those executable elements. The queue manager may traverse the graph to find the elements that may be executed in the near future.

The scheduling graph may identify the functional elements of one or many applications, where an application may be a program that operates independently of other programs on a computer system. When a scheduling graph includes multiple applications, the scheduling graph may be considered a graph of graphs, with each application contributing a group of functional elements that may or may not have relationships with other applications within the overall scheduling graph.

In some embodiments, a queue scheduler may be implemented as a runtime environment in which applications are executed. Such an environment may be a virtual machine component that may have just in time compiling, garbage collection, thread management, and other features. In such an embodiment, a queue scheduler may interface with the runnable and idle queues of an operating system. When a queue scheduler is implemented in a runtime environment, one or more applications may have functional elements defined in the scheduling graph.

In other embodiments, the queue scheduler may be implemented as a component of an operating system. As an operating system component, some or all of the functional elements that are executed by a computer system may be identified within a scheduling graph. Such a scheduling graph may include functions relating to multiple applications as well as operating system functions. In such an embodiment, each operation that may be performed by a computer system may be added to the scheduling graph prior to any execution of such operation.

The process scheduler may be known as a CPU scheduler and may determine which of the ready, in-memory processes may be executed following a clock interrupt, I/O interrupt, operating system call, or other form of signal. In some embodiments, the process scheduler may be preemptive, which may allow the process scheduler to forcibly remove executing elements from a processor when the processor may be allocated to another process. In some embodiments, the process scheduler may be non-preemptive, which may be known as voluntary or cooperative process scheduler, where the process scheduler may be unable to force executing elements off of a processor.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include many processors 108, random access memory 110, and nonvolatile storage 112. The hardware components 104 may also include a user interface 114 and network interface 116. The processors 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The operating system 118 may include a process scheduler 120 which may have runnable queues 122 for each of the processors 108. The process scheduler 120 may be a processor-level scheduler which may switch jobs on and off the processors 108 during execution. In some embodiments, a single process scheduler 120 may assign jobs to multiple processors or cores. In other embodiments, each core or processor may have its own process scheduler.

The runnable queues 122 may include all of the executable elements that are ready for execution. In cases, the runnable executable elements may be held in a queue from which any available processor may pull a job to execute. In an embodiment where each processor may have its own process scheduler, separate runnable queues may be available for each processor.

An execution environment 124 may manage the execution of an application 128. The execution environment 124 may have a queue manager 126 that may manage the executable elements by storing those elements in the runnable queues 122.

The queue manager 126 may identify individual executable elements from a scheduling graph 130. The scheduling graph 130 may define the relationships between executable elements for a specific application. As one set of executable elements is executing, those executable elements that may receive the output of the executing elements may be added to the runnable queues 124.

The scheduling graph 130 may be similar to a control flow graph and may include each block of executable code and the dependencies or other relationships between the blocks. The scheduling graph 130 may be searched and traversed to identify relationships between the executing elements and downstream or dependent elements. Those elements that are dependent on executing elements may be added to the runnable queues of the processors.

The scheduling graph 130 may be created when an application is developed. A development environment 132 may include an editor, 134, compiler 136, and an analyzer 138. A programmer or developer may create a program using the editor 134 and compile the program with the compiler 136. A control flow graph may be created by the compiler 136 or by a secondary analyzer 138 which may be executed after compilation.

From the control flow graph, an analyzer 138 may identify and classify the relationships between executable elements. The relationships may be any type of relationship, including dependencies, parallelism or concurrency identifiers, or other relationships. At compile time, the nature of the relationships may be identified.

The execution environment 124 may be a virtual machine or other mechanism that may manage executing applications. In some cases, the execution environment may provide various management functions, such as just in time compiling, garbage collection, thread management, and other features.

In some embodiments, a queue manager 140 may be part of an operating system 118. In such embodiments, the operating system 118 may operate by receiving a set of functions to perform and a scheduling graph 130. The scheduling graph 130 may include functions that come from many different applications as well as functions that are performed by the operating system itself.

Figure 2:
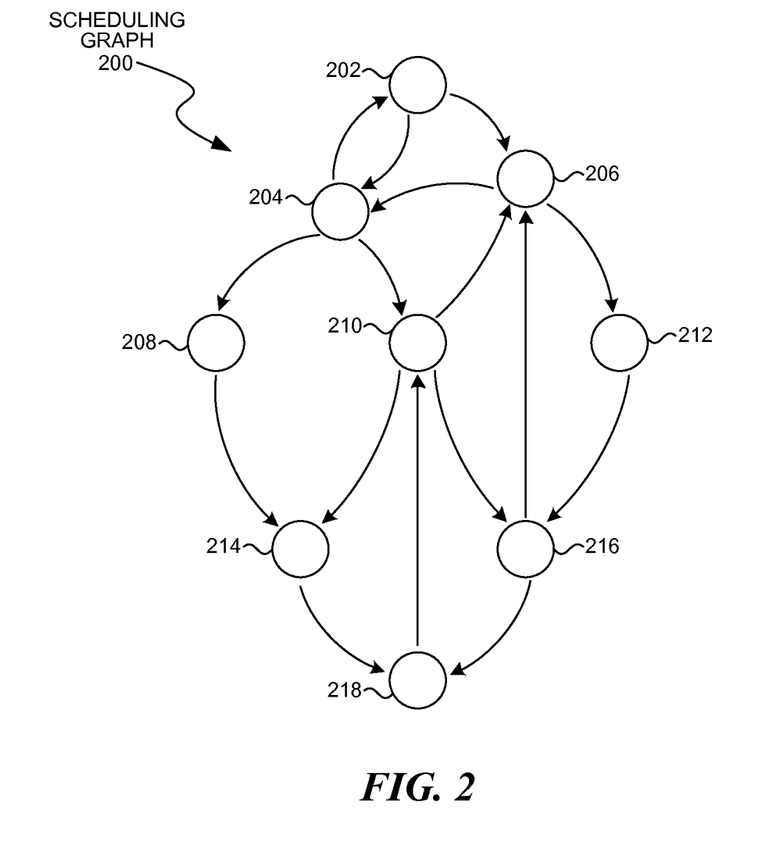
FIG. 2 is a diagram illustration of an embodiment showing an example scheduling graph.

FIG. 2 is a diagram illustration of an embodiment 200 showing an example scheduling graph. Embodiment 200 illustrates several executable elements and the relationships between those elements.

Embodiment 200 illustrates execution elements 202, 204, 206, 208, 210, 212, 214, 216, and 218.

Element 202 is shown having a two-way relationship with element 204, which has a dependent relationship with element 206. Element 206 is illustrated as being dependent on elements 202 or 216.

Element 208 has a dependent relationship with item 204, and element 210 has dependent relationships with elements 204 and 218. Element 212 has a dependent relationship with item 206.

Element 214 has dependent relationships with element 208 and 210. Element 216 has dependent relationships with elements 210 and 212. Lastly, element 218 has dependent relationships with items 214 and 216.

The various elements and relationships in embodiment 200 illustrate different executable elements that may comprise a larger application. As each executable element is completed, control may be passed to another executable element having a relationship with the completed element. In some cases, there may be a branch or other condition that may cause one element to be executed instead of a second. In some cases, two or more elements may be executed simultaneously when a first one completes. Some cases may also have one executing element to spawn dependent elements without stopping the first executing element. Other relationships, situations, and conditions may also be encountered in various embodiments.

Figure 3:
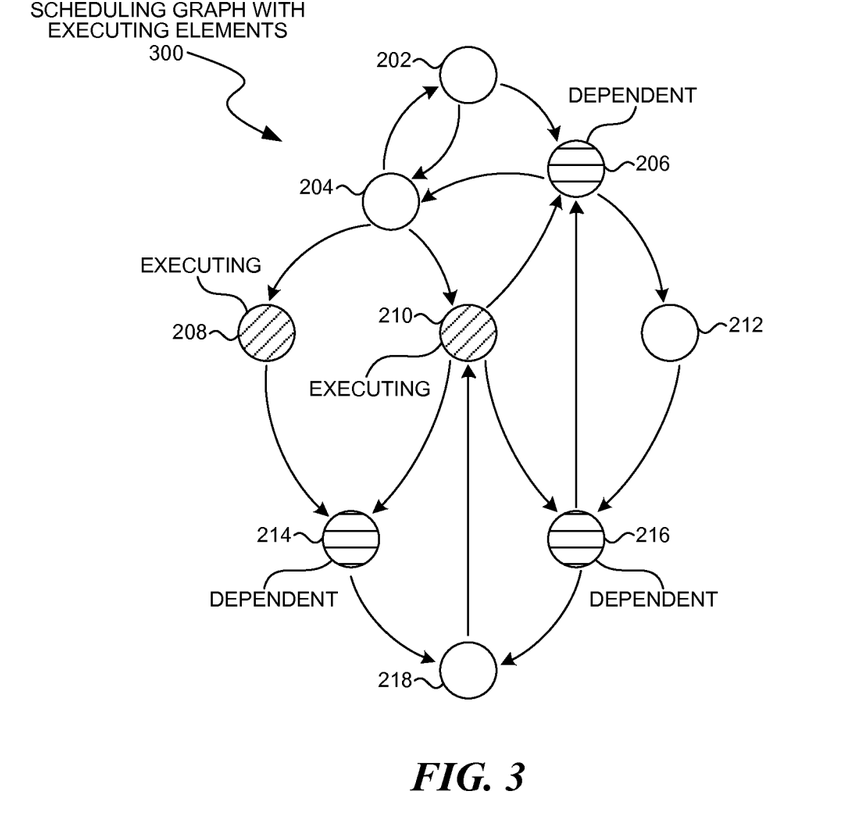
FIG. 3 is a diagram illustration of an embodiment showing an example scheduling graph with executing and dependent elements.

FIG. 3 illustrates an embodiment 300 showing an example condition in which the scheduling graph of embodiment 200 is illustrated.

Embodiment 300 illustrates an example of how dependent executable elements may be identified given a set of executing elements. In the example of embodiment 300, items 208 and 210 are illustrated as executing. From the scheduling graph, executable elements 206, 214, and 216 are identified as potential elements that may be executed next.

The dependent elements 206, 214, and 216 may be identified by traversing the graph 300 starting with the executing elements and evaluating the relationships to the other elements. An execution environment may place the dependent elements 206, 214, and 216 into an idle queue, while other items may not be placed in the idle queue.

As new items begin execution, the execution environment may again analyze the scheduling graph to determine which new elements may be dependent, then add the new elements to the idle queue.

Similarly, as the set of executing elements change, the scheduling graph may be analyzed to identify items that are no longer reachable from the executing items. Such items that are no longer reachable may be removed from the idle queue.

The example of embodiment 300 shows an example where a first generation of dependent items may be identified. In other embodiments, a two-generational analysis may identify all of the elements that have two dependent relationships to an executing element. Other embodiments may perform analyses that examine three, four, or more generations of dependent elements.

Embodiments that use multi-generational analysis may perform analyses on a less frequent basis than embodiments that perform analyses on fewer generations. However, multi-generational analyses may create a larger queue of idle elements that may be managed.

Figure 4:
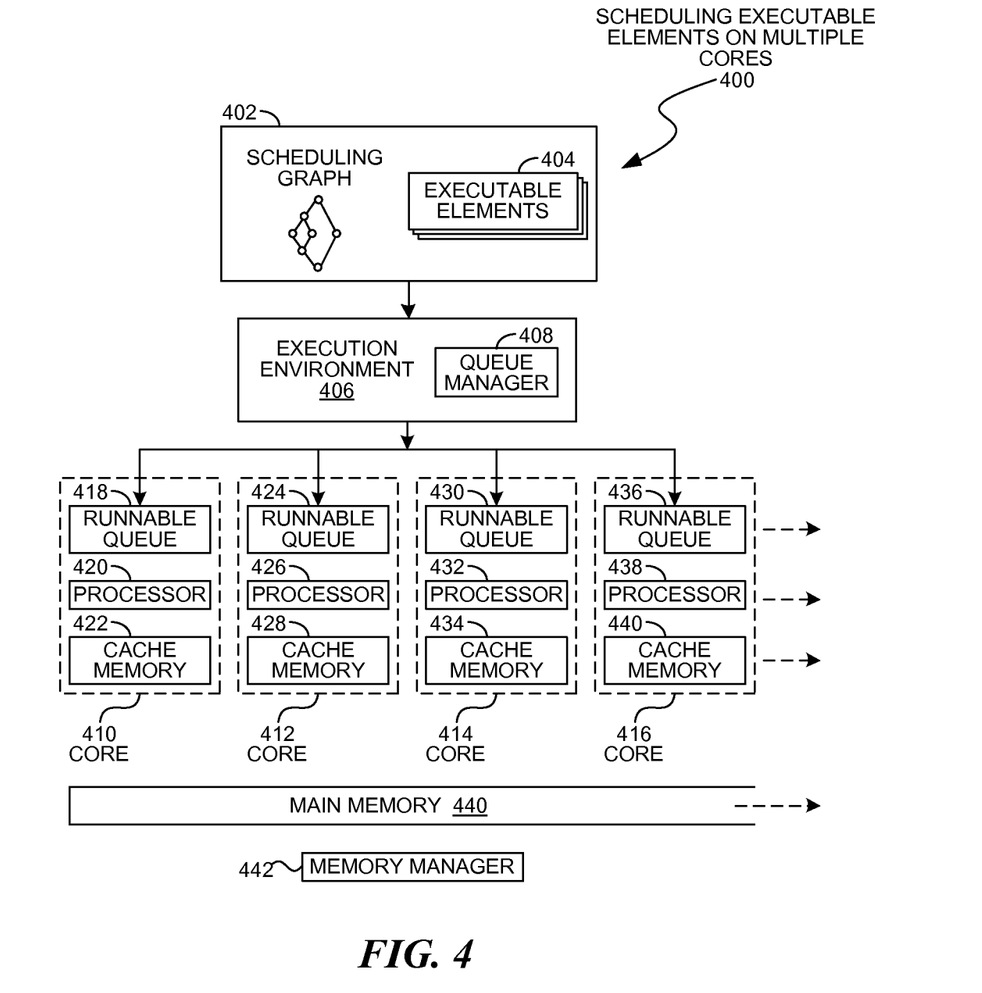
FIG. 4 is a diagram illustration of an embodiment showing scheduling of executable elements on multiple cores.

FIG. 4 is a diagram illustration showing an embodiment 400 of various components that may operate together to place executable elements in runnable queues for various processors. Embodiment 400 illustrates the components that take a scheduling graph 402 and optimize placement of executable elements 404 on various runnable queues.

Embodiment 400 illustrates several cores 410, 412, 414, and 416 are illustrated. In many embodiments, the number of cores may be 4, 8, 16, 32, or even several hundred or more cores. For each core 410, 412, 414, and 416, a separate runnable queue 418, 424, 430, and 436 are shown. Each core may have a processor 420, 426, 432, and 438, as well as independent cached memory 422, 428, 434, and 440.

The cached memory may be a cached portion of main memory 440, which may be managed by a memory manager 442. The memory manager 442 may retrieve memory objects from main memory 440 and place those objects in cached memory. As the cached memory objects age, the objects may be moved to different stages of cached memory and eventually back to the main memory 440. Similarly, the memory manager 442 may identify newly created or modified memory objects in cache and write those objects to main memory 440.

An execution environment 406 may have a queue manager 408 that may place executable elements 404 in the various runnable queues. In some embodiments, the execution environment 406 may be a virtual machine or other runtime environment in which applications may be executed. The execution environment 406 may provide various other services, such as garbage collection.

The queue manager 408 may attempt to schedule executable elements on the same core where those executable elements share a common memory object. In so doing, the second executable element may be able to access the memory object from cached memory, rather than having to request the memory object from main memory 440.

Figure 5:
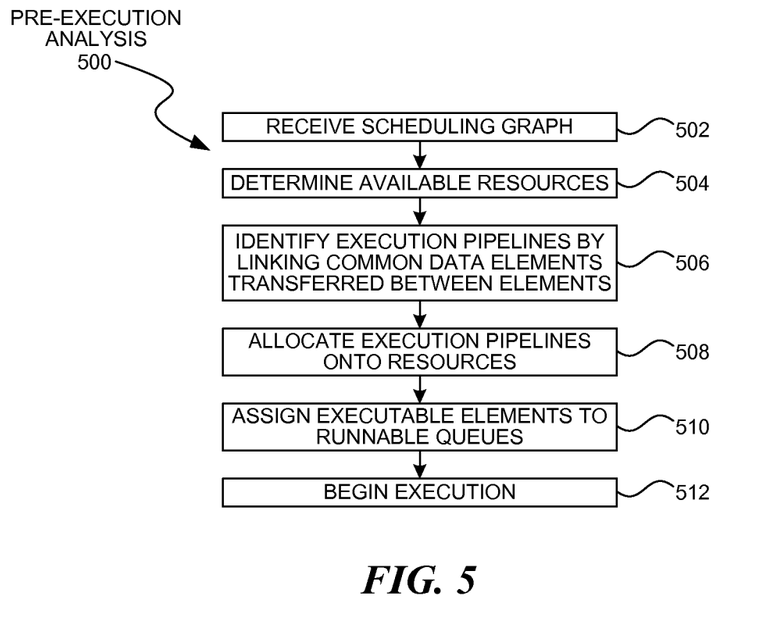
FIG. 5 is a flowchart illustration of an embodiment showing a method for pre-execution analysis.

FIG. 5 is a flowchart illustration of an embodiment 500 showing a method for preparing executable elements using a scheduling graph. Embodiment 500 illustrates a set of operations that a queue manager may perform prior to beginning execution.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates how a queue manager or other component may prepare an application or other set of executable elements for execution. The scheduling graph may be used to identify pipelines or groups of executable elements that have related operations. From those related operations, the executable elements may be allocated across the available resources to begin execution.

The scheduling graph may be received in block 502. The scheduling graph may include executable elements and relationships between those elements. In many cases, the relationships may include message passing or common data elements.

In block 504, the available resources may be identified. In a many-core or multi-core system, the available resources for the elements in the scheduling graph may be a subset of the full resources of the system.

In block 506, execution pipelines may be identified from the scheduling graph. Execution pipelines may be executable elements that pass data from one element to the next. In many cases, the relationships of shared data or message passing may indicate that two elements are linked in an execution pipeline.

The execution pipelines may be allocated to the resources in block 508. Once the execution pipelines are known, the elements may be assigned to runnable queues in block 510 and the execution may begin in block 512.

The mechanism of embodiment 500 illustrates one way that executable elements that have common data may be arranged in a sequence or pipeline, then deployed on processors for execution. By keeping executable elements on the same processor and in sequence, the executable elements may have a higher probability of accessing common items from cache rather than from main memory.

Figure 6:
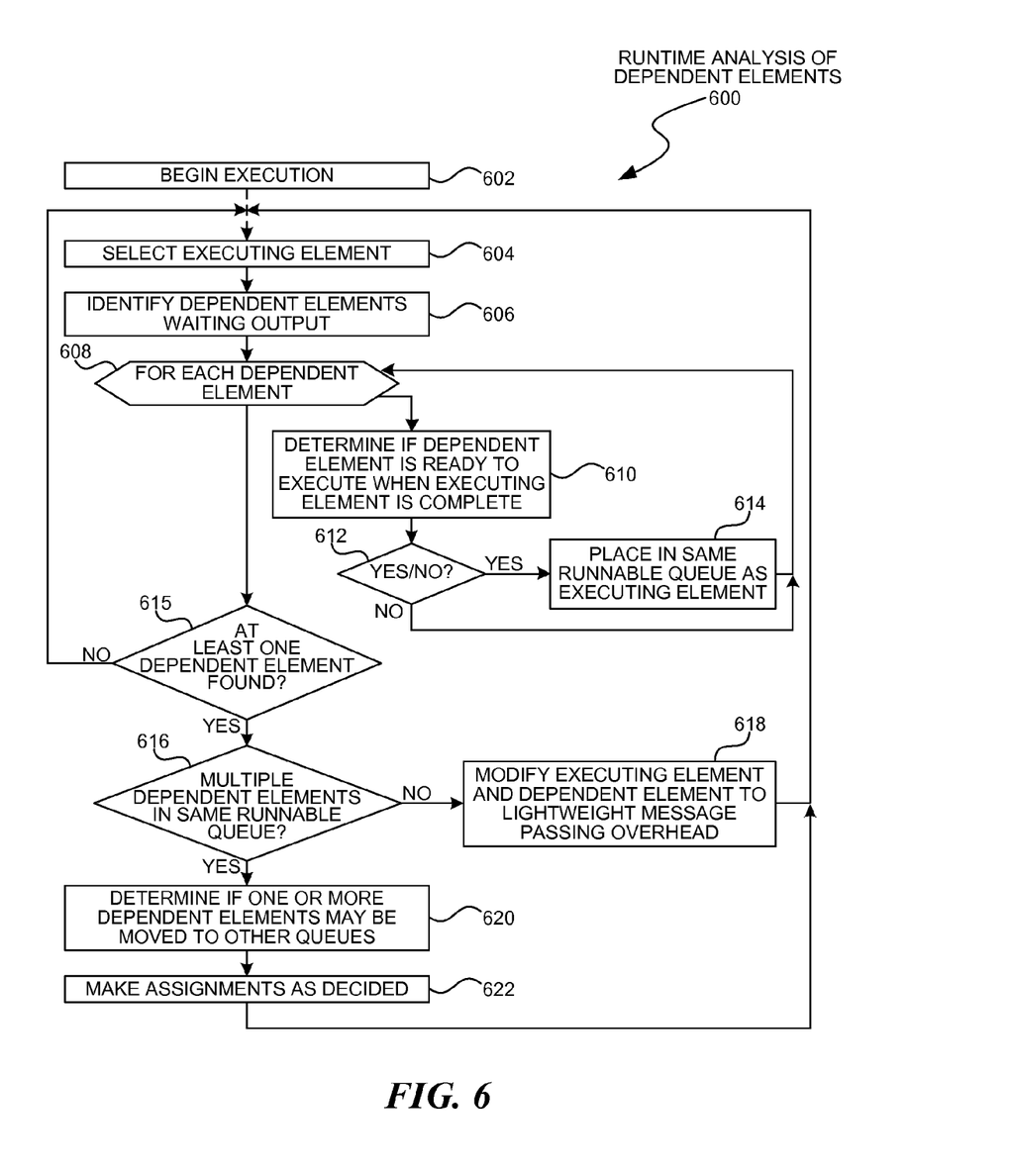
FIG. 6 is a flowchart illustration of an embodiment showing a method for runtime analysis of dependent elements.

FIG. 6 is a flowchart illustration of an embodiment 600 showing a method for runtime analysis of dependent elements. Embodiment 600 illustrates one mechanism by which executing elements may be paired with dependent elements so that shared data may be accessed through cached memory.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates a process that may place two related executing elements on the same processor so that shared memory objects may be transferred in cache memory. Embodiment 600 identifies a dependent element that is ready to execute, except that the dependent element is waiting for the output from an executing item. When the executing element finishes processing, the dependent element may be started on the same processor as soon as possible thereafter. Such a condition may give the highest probability that shared memory items may be accessed through cached memory.

In block 602, execution may begin. The execution may start using the pipelined executable elements identified in embodiment 500.

While execution is underway, an executing element may be selected in block 604.

One or more dependent items may be identified in block 606 using the scheduling graph defined for the executing processes. For the purposes of example, the dependencies may be illustrated as message passing dependencies.

Each dependent item may be analyzed in block 608.

For each dependent item in block 608, a determination may be made in block 610 whether or not the dependent element is ready to execute when the executing element has completed. The analysis of block 610 determines if the dependent element is dependent on other processes, input data, or other dependencies. When the dependent element is dependent on other items, that element may continue to wait until those dependencies are fulfilled before execution.

Those items that are ready for execution and are dependent on the executing item in block 612 may be placed in the runnable queue for the same processor as the executing element in block 614. If the dependent element is not ready for immediate processing, the process may return to block 608 to analyze another dependent element.

After processing all of the dependent elements in block 608 and at least one dependent element was found in block 615, the process may proceed to block 616. If no dependent items were found in block 615, the process may return to block 604 to analyze another executing element.

When no dependent elements are found, the processor executing the currently executing element may be freed to execute any element ready for processing. In such a case, the next element may retrieve its memory objects from main memory as opposed to memory cache.

In block 616, if there is only one dependent element in the runnable queue, the executing element and the dependent element may be modified in block 618 to perform a lightweight message passing system. The lightweight message passing system may eliminate or minimize any message passing overhead that may otherwise occur between the executing element and the dependent element. In one example of such a modification, the dependent element may be given a memory identifier for an output value from the executing element.

In block 616, if there are multiple dependent elements that were identified in block 610 and added to the runnable queue, an analysis may be made in block 620 to determine whether or not one or more of the dependent elements may be moved to other queues. Based on such an analysis, the dependent elements may be assigned in block 622.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a plurality of processors;
an operating system executing on said plurality of processors;
an individual runnable queue for each of said processors, said each runnable queue comprising one or more executable elements ready for execution by a processor; and
a queue manager being part of said operating system, said queue manager being configured to perform at least the following:
receive a scheduling graph comprising a plurality of executable elements and relationships between said executable elements;
schedule a first executable element of the plurality of executable elements to execute on a first processor of the plurality of processors;
from said scheduling graph, identify a second executable element and a third executable element of the plurality of executable elements that have one or more generational dependent relationships with said first executable element, and place said second executable element and said third executable element on an idle queue as potential executable elements that may be executed;
based at least on determining that any other dependencies of said second executable element have been fulfilled and that said second executable element is ready to execute when the execution of said first executable element is complete, place said second executable element in said runnable queue for said first processor, said first processor being connected to a memory cache, said first executable element placing a memory object in said memory cache upon completion and said second executable element retrieving said memory object from said memory cache upon execution, wherein said first executable element and said second executable element are modified to perform a lightweight message passing based at least on determining that said second executable element is the only dependent element in said runnable queue for said first processor; and
based at least on executing said second executable element on said first processor, determine that said third executable element is no longer reachable from said second executable element, and remove said third executable element from said idle queue.

2. The system of claim 1, said relationships comprising message passing between executable elements.

3. The system of claim 2, said message passing being based on at least one of explicit message passing and implicit message passing.

4. The system of claim 1, said first executable element and said second executable element being functional blocks defined using a functional programming mechanism.

5. The system of claim 4, said functional blocks being originally defined in a functional programming language.

6. The system of claim 1, said queue manager being a function within an execution environment.

7. The system of claim 1, said queue manager being a function within an operating system.

8. The system of claim 1, said scheduling graph comprising executable elements from a plurality of applications.

9. The system of claim 8, said scheduling graph comprising executable elements defining operating system level functions.

10. The system of claim 1, said queue manager also being configured to modify said second executable element by giving it a memory identifier for an output value from the first executable element.

11. A method implemented at a multiple processor computer system, for scheduling executable elements, said method comprising:
receiving a scheduling graph comprising a plurality of executable elements and relationships between said executable elements;
scheduling a first executable element of the plurality of executable elements to execute on a first processor in said multiple processor system, said first processor being associated with a runnable queue comprising one or more executable elements ready for execution;
from said scheduling graph, identifying a second executable element and a third executable element of the plurality of executable elements that have one or more generational dependent relationships with said first executable element, and placing said second executable element and said third executable element on an idle queue as potential executable elements that may be executed;
based at least on determining that any other dependencies of said second executable element have been fulfilled and that said second executable element is ready to execute when the execution of said first executable element is complete, placing said second executable element in said runnable queue for said first processor, said first processor being connected to a memory cache, said first executable element placing a memory object in said memory cache upon completion and said second executable element retrieving said memory object from said memory cache upon execution, wherein said first executable element and said second executable element are modified to perform a lightweight message passing based at least on determining that said second executable element is the only dependent element in said runnable queue for said first processor; and
based at least on executing said second executable element on said first processor, determining that said third executable element is no longer reachable from said second executable element, and removing said third executable element from said idle queue.

12. The method of claim 11 further comprising:
creating said scheduling graph by identifying said executable elements and said relationships between said executable elements.

13. The method of claim 12 further comprising:
receiving an application to execute, said application comprising said executable elements; and
identifying said relationships between said executable elements.

14. The method of claim 13, said second executable element having a dependent relationship with first executable element based on a message passing between said first executable element and said second executable element.

15. The method of claim 13, said second executable element having a dependent relationship with first executable element based on a common memory object shared by said first executable element and said second executable element.

16. The method of claim 12, said creating said scheduling graph being performed at least in part at runtime.

17. The method of claim 11, further comprising determining if one of the first or second executable elements may be moved to a runnable queue for a second processor.

18. The method of claim 11, further comprising modifying said second executable element by giving it a memory identifier for an output value of the first executable element.

19. A computer program product comprising one or more hardware storage devices having stored thereon computer executable instructions that are executable by one or more processors of a multiprocessor system, and that configure the multiprocessor system to perform at least the following:
receive a scheduling graph comprising a plurality of executable elements and relationships between said executable elements;
schedule a first executable element of the plurality of executable elements to be processed on a first processor of said multiprocessor system, said first processor being associated with a runnable queue comprising one or more executable elements ready for execution;
from said scheduling graph, identify a second executable element and a third executable element of the plurality of executable elements that have one or more generational dependent relationships with said first executable element, and place said second executable element and said third executable element on an idle queue as potential executable elements that may be executed;
based at least on determining that any other dependencies of said second executable element have been fulfilled and that said second executable element is ready to execute when the execution of said first executable element is complete, placing said second executable element in said runnable queue to be executed on said first processor after said first executable element completes processing, said first processor being connected to a memory cache, said first executable element placing a memory object in said memory cache upon completion and said second executable element retrieving said memory object from said memory cache upon execution, wherein said first executable element and said second executable element are modified to perform a lightweight message passing based at least on determining that said second executable element is the only dependent element in said runnable queue for said first processor; and
based at least on executing said second executable element on said first processor, determine that said third executable element is no longer reachable from said second executable element, and remove said third executable element from said idle queue.

* * * * *